US007987457B2

(12) United States Patent
Biswas et al.

(10) Patent No.: US 7,987,457 B2
(45) Date of Patent: Jul. 26, 2011

(54) TARGETED PATCHING FOR NATIVE GENERATION IMAGES

(75) Inventors: Surupa Biswas, Redmond, WA (US); Ori Gershony, Redmond, WA (US); Jan Kotas, Redmond, WA (US); Peter F. Sollich, Munich (DE)

(73) Assignee: Microsoft Corporation, Redmond, WA (US)

( * ) Notice: Subject to any disclaimer, the term of this patent is extended or adjusted under 35 U.S.C. 154(b) by 1065 days.

(21) Appl. No.: 11/821,611

(22) Filed: Jun. 25, 2007

(65) Prior Publication Data
US 2008/0320456 A1 Dec. 25, 2008

(51) Int. Cl.
*G06F 9/45* (2006.01)
(52) U.S. Cl. ........................................ 717/145
(58) Field of Classification Search .................. 717/168, 717/152
See application file for complete search history.

(56) References Cited

U.S. PATENT DOCUMENTS

| | | | |
|---|---|---|---|
| 5,519,866 A | 5/1996 | Lawrence et al. | |
| 5,586,328 A | 12/1996 | Caron et al. | |
| 5,842,017 A * | 11/1998 | Hookway et al. | 717/158 |
| 5,854,932 A | 12/1998 | Mariani et al. | |
| 5,916,308 A | 6/1999 | Duncan et al. | |
| 5,966,539 A | 10/1999 | Srivastava et al. | |
| 5,978,585 A | 11/1999 | Crelier | |
| 6,289,506 B1 | 9/2001 | Kwong et al. | |
| 6,484,313 B1 | 11/2002 | Trowbridge et al. | |
| 6,658,421 B1 | 12/2003 | Seshadri | |
| 6,973,646 B1 | 12/2005 | Bordawekar et al. | |
| 7,496,912 B2 * | 2/2009 | Keller et al. | 717/174 |
| 2005/0091347 A1 | 4/2005 | Schmitt et al. | |
| 2006/0080656 A1 * | 4/2006 | Cain et al. | 717/174 |
| 2006/0117310 A1 * | 6/2006 | Daniels et al. | 717/168 |
| 2006/0130040 A1 * | 6/2006 | Subramanian et al. | 717/168 |
| 2006/0184652 A1 * | 8/2006 | Teodosiu et al. | 709/221 |
| 2006/0248097 A1 | 11/2006 | Pritchard et al. | |
| 2007/0011666 A1 | 1/2007 | Tan | |

OTHER PUBLICATIONS

Adams, et al., "The Cost of Selective Recompilation and Environment Processing", ACM Transactions on Software Engineering and Methodology, Date: Jan. 1994, pp. 3-28, vol. 3, No. 1.
Kennedy et al., "Pre-Compilation for .NET Generics", Microsoft Research, Cambridge, U.K., 2005, 17 pages.
Rabe, "Towards a CLI Assembly for Embedded Systems", Proceedings of the 2006 International Conference on Embedded Systems & Applications, Las Vegas, Nevada, Jun. 2006, ISBN 1-60132-0175-5, 7 pages.
Barr, et al., "Safe Upgrading without Restarting", International Conference on Software Maintenance—ICSM, Amsterdam, The Netherlands, Sep. 2003, 9 pages.

* cited by examiner

Primary Examiner — Anna Deng

(57) ABSTRACT

Various technologies and techniques are disclosed that provides targeted patching for native generation images. Changed binaries are updated with information that indicates whether or not they contain safe changes. A servicing process can then be provided for a client machine. For any compatible binaries with changes that have been identified as safe, a native generation update is performed that includes recompilation of the compatible binaries with the safe changes, and an updating of binding information for any dependent binaries. For any non-compatible binaries with changes that have been identified as unsafe, a native generation update is performed that includes recompilation of any non-compatible binaries and any dependent binaries.

14 Claims, 7 Drawing Sheets

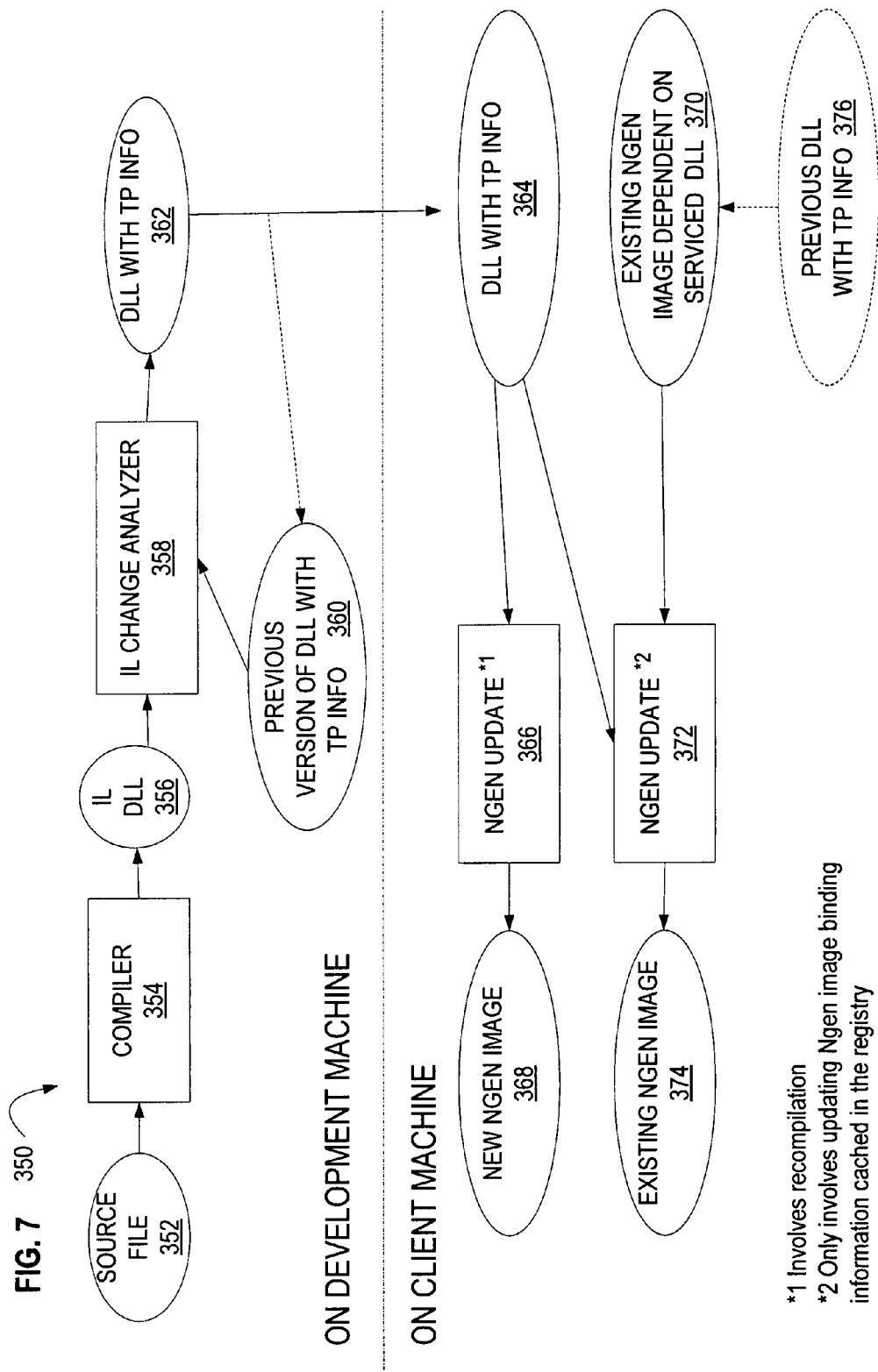

TARGETED PATCHING FOR NATIVE GENERATION IMAGES

BACKGROUND

Many applications and libraries are distributed in an intermediate format, such as the MICROSOFT® Intermediate Language (MSIL). These intermediate language binaries (also known as managed assemblies in the case of MICROSOFT® .NET) are typically compiled dynamically at runtime in a virtual machine environment using a Just-in-Time (JIT) compiler. An alternative to dynamic compilation is pre-compilation via Native Generation (NGen). NGen generates machine code and runtime data structures from the intermediate language and persists them in files on disk. The images produced by NGen are called Native or NGen images. Unlike JIT-compiled code, code and data structures in NGen images can be shared across processes. For libraries and frameworks that are typically shared across multiple processes, NGen is extremely useful since it minimizes the working set of each managed process. NGen therefore reduces the overall memory utilization of the system. NGen is also very useful for minimizing start up time of client-side applications.

Several managed platforms/applications are using NGen. Unfortunately, however, it is quite difficult to use NGen in these current platforms. One difficulty that NGen introduces is with servicing. NGen images are persisted on disk, and have to be regenerated as the corresponding intermediate language binaries get updated. Pre-compilation via NGen introduces a servicing burden, which is made worse by the fact that NGen images are "servicing-unfriendly". One of the biggest issues with servicing NGen images is the fact that servicing an intermediate language binary not only requires the corresponding NGen image to be regenerated, but also requires all intermediate language binaries that depended on the serviced binary to be recompiled. Therefore servicing a binary that a large number of intermediate language binaries depend upon, on a machine that has a lot of managed applications and NGen images, can result in long servicing events or long periods of background compilation which consume machine resources and adversely impact managed application performance.

SUMMARY

Various technologies and techniques are disclosed that provide targeted patching for native generation images. Changed binaries are updated with information that indicates whether or not they contain safe changes. In one implementation, the updated binary is compared to an older version of the binary to determine what changed. The changes are then compared to a list of safe changes to determine if the changes are safe, and if so, the binary is updated with information such as an indicator to designate it as safe.

A servicing process can then be provided for a client machine. For any binaries with changes that have been identified as safe, a native generation update is performed that includes recompilation of the binaries with the safe changes, and an updating of binding information for any dependent binaries. For any non-compatible binaries with changes that have been identified as unsafe, a native generation update is performed that includes recompilation of any non-compatible binaries and any dependent binaries.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is a logical diagram for one implementation of the system of FIG. 1 that illustrates exemplary components used in the processes described in FIGS. 3-6.

DETAILED DESCRIPTION

Figure 1:
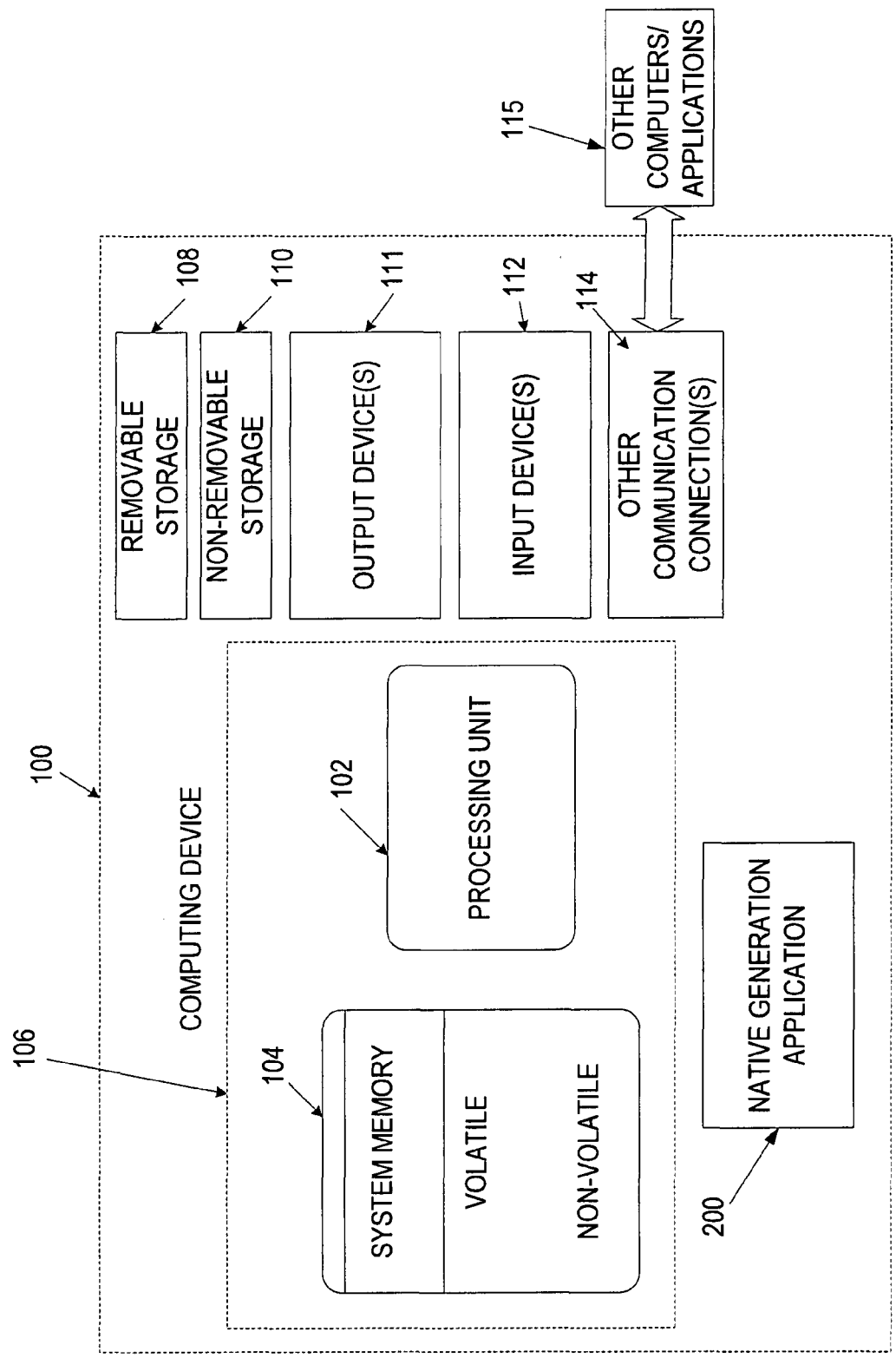
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that generates and updates native images (NGen images) in a virtual machine environment, but the system also serves other purposes in addition to these. In one implementation, one or more of the techniques described herein can be implemented as features within a framework program such as MICROSOFT® .NET Framework, Java Virtual Machine, or from any other type of program or service that deals with an intermediate language and then needs to compile that intermediate language into machine code for execution on a target machine.

In one implementation, a native generation application is provided that supports targeted patching which minimizes the number and frequency of binaries that need to be recompiled. Certain types of changes are identified as being safe changes, and any time binaries are modified with changes that only include safe changes, they can be marked with an indicator that notes their dependent binaries can still operate without recompilation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes native generation application 200. Native generation application 200 will be described in further detail in FIG. 2.

Figure 2:
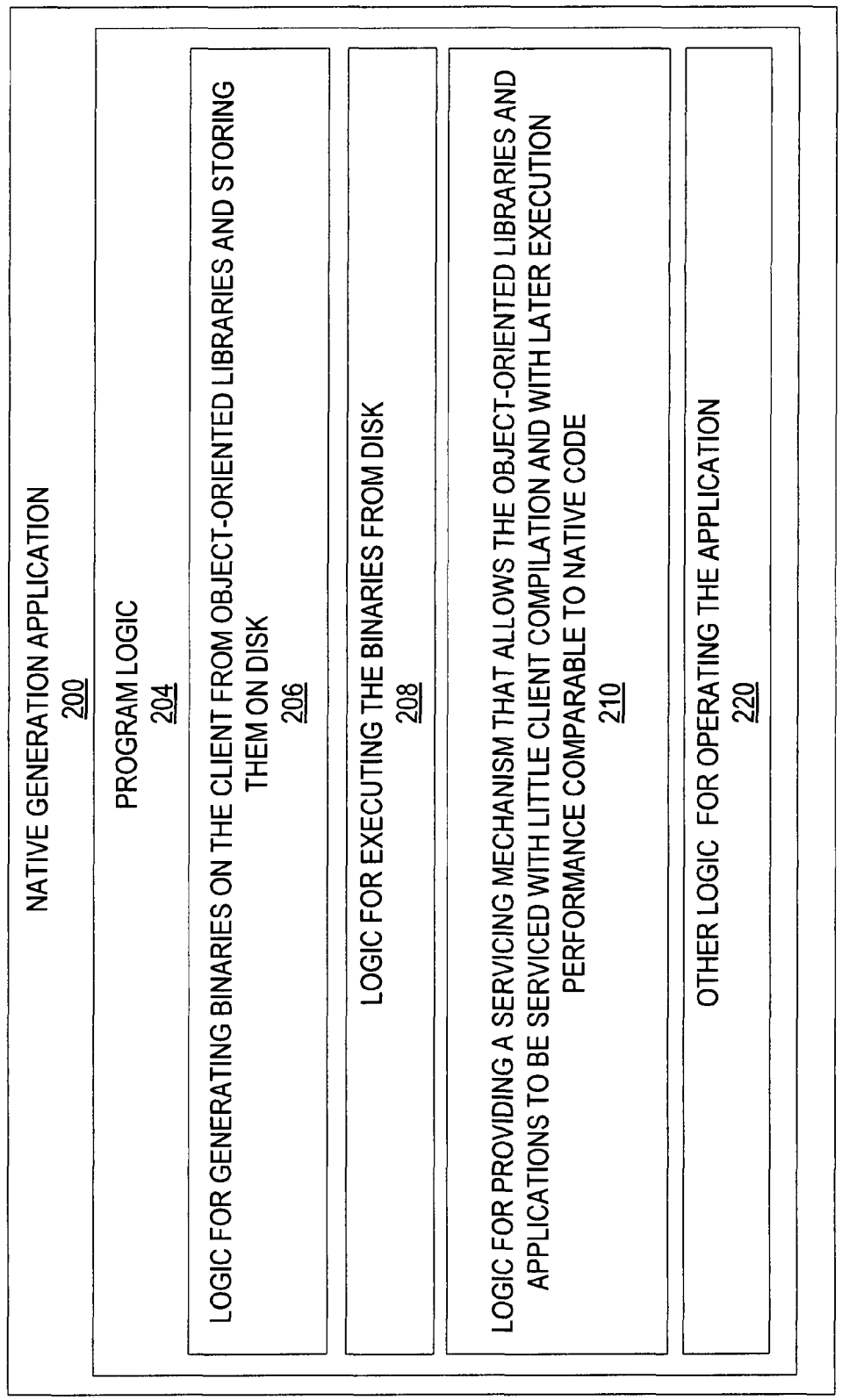
FIG. 2 is a diagrammatic view of a native generation application of one implementation operating on the computer system of FIG. 1.

Turning now to FIG. 2 with continued reference to FIG. 1, a native generation application 200 operating on computing device 100 is illustrated. Native generation application 200 is one of the application programs that reside on computing device 100. However, it will be understood that native generation application 200 can alternatively or additionally be embodied as computer-executable instructions on one or more computers and/or in different variations than shown on FIG. 1. Alternatively or additionally, one or more parts of native generation application 200 can be part of system memory 104, on other computers and/or applications 115, or other such variations as would occur to one in the computer software art.

Native generation application 200 includes program logic 204, which is responsible for carrying out some or all of the techniques described herein. Program logic 204 includes logic for generating binaries on the client from object-oriented libraries and storing them on disk 206; logic for executing the binaries from disk 208; logic for providing a servicing mechanism that allows the object-oriented libraries and application to be serviced with little client compilation and with later execution performance comparable to native code 210; and other logic for operating the application 220. In one implementation, program logic 204 is operable to be called programmatically from another program, such as using a single call to a procedure in program logic 204.

Figure 3:
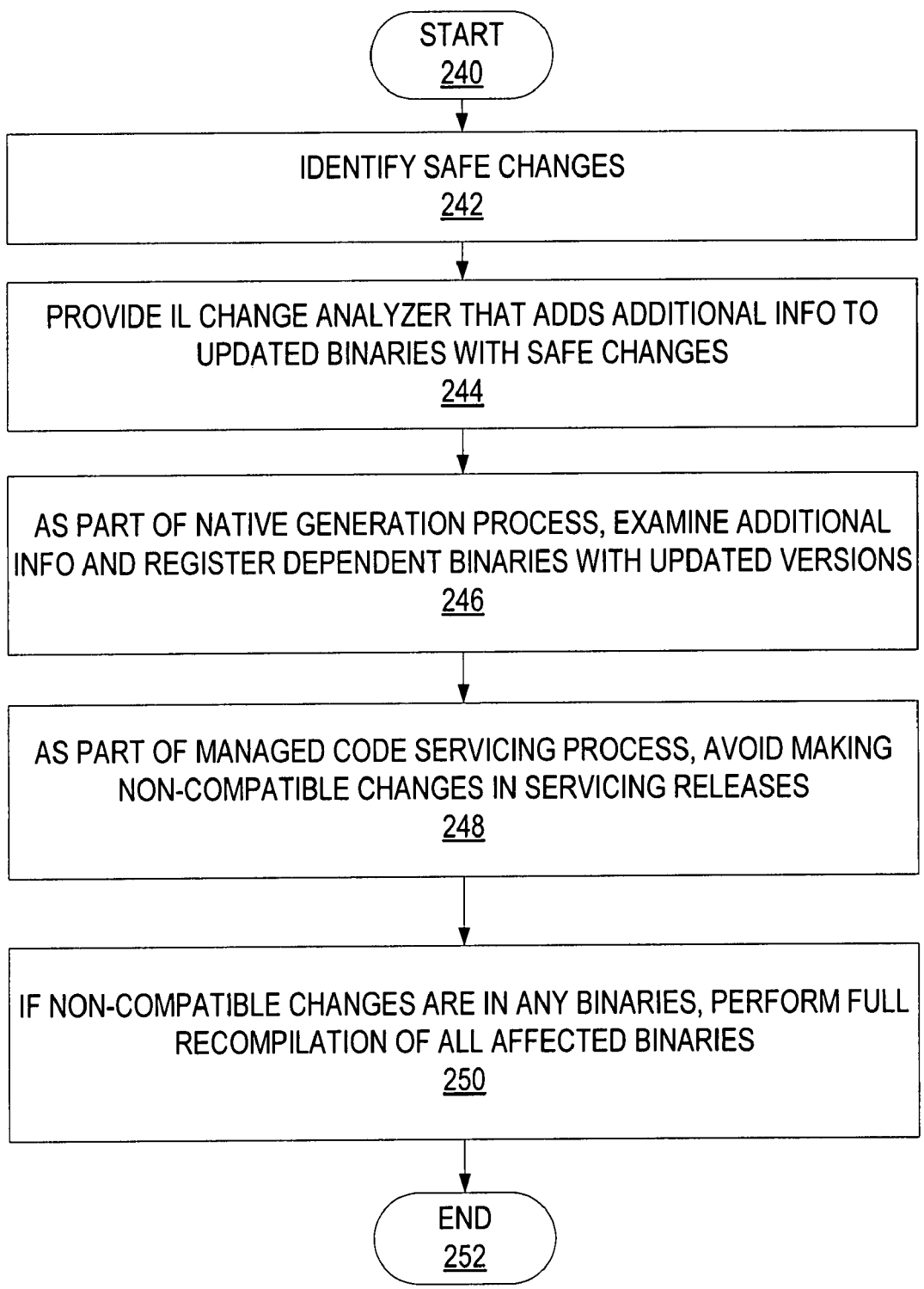
FIG. 3 is a high-level process flow diagram for one implementation of the system of FIG. 1.

Turning now to FIGS. 3-6 with continued reference to FIGS. 1-2, the stages for implementing one or more implementations of native generation application 200 are described in further detail. FIG. 3 is a high level process flow diagram for native generation application 200. In one form, the process of FIG. 3 is at least partially implemented in the operating logic of computing device 100. The process begins at start point 240 with identifying safe changes that can be made to a managed binary without impacting the NGen images for binaries that depend on the changed one (stage 242). An intermediate language change analyzer is provided that adds additional information to updated binaries with safe changes to mark the binary as having safe changes (stage 244). As part of the NGen process, the system examines the additional information marked on the safely changed binaries and registers dependent binaries with updated versions (stage 246). As part of the managed code servicing process, the system avoids making non-compatible changes in the servicing release (stage 248). If non-compatible changes are in any binaries, a full recompilation is performed on all affected binaries (stage 250). The process ends at end point 252.

Figure 4:
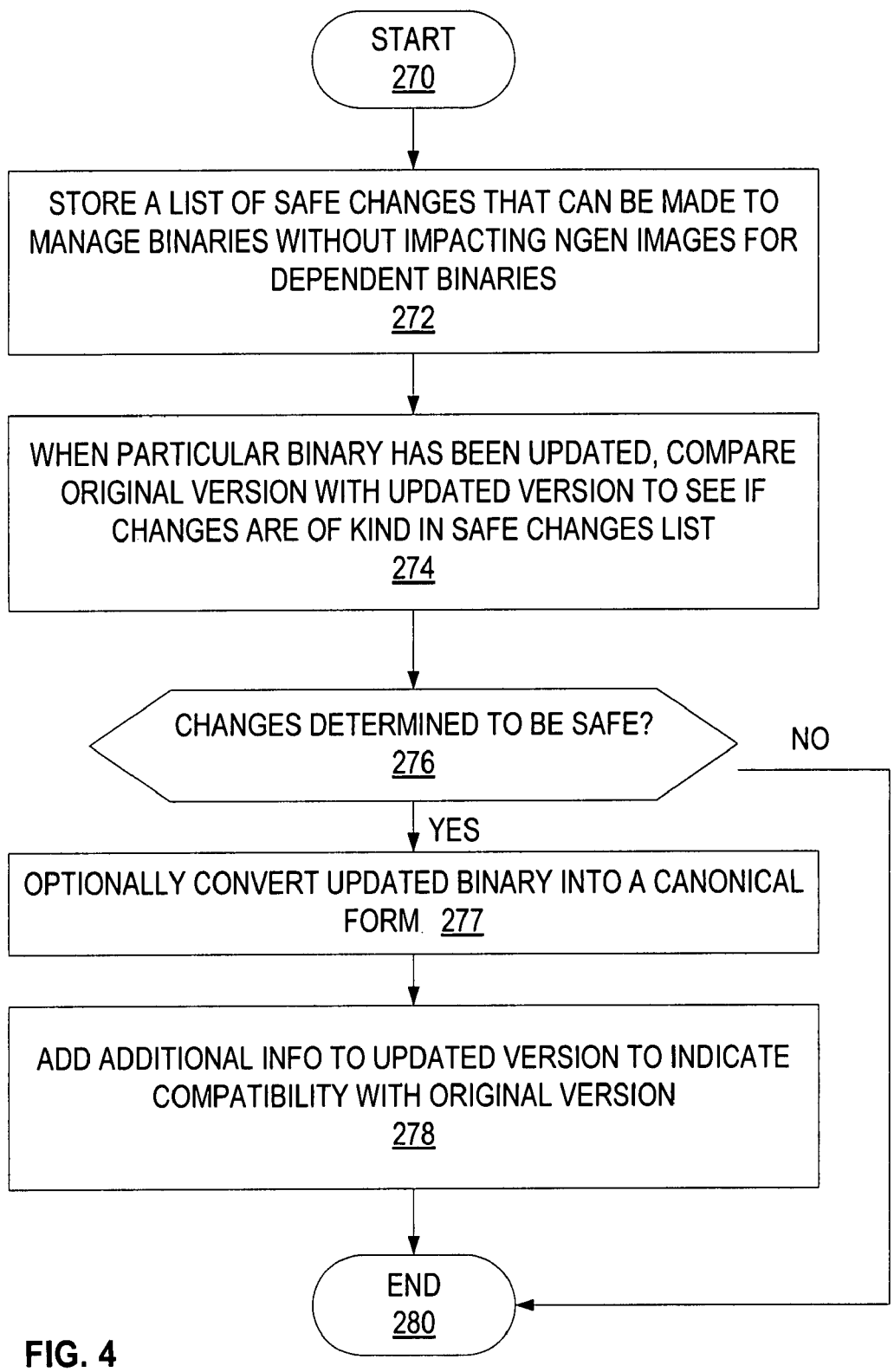
FIG. 4 is a process flow diagram for one implementation of the system of FIG. 1 illustrating the stages involved in providing a change analyzer to determine whether changes in a binary are safe for targeted patching.

FIG. 4 illustrates one implementation of the stages involved in providing a change analyzer to determine whether changes in a binary are safe for targeted patching. In one form, the process of FIG. 4 is at least partially implemented in the operating logic of computing device 100. The process begins at start point 270 with storing a list of safe changes that can be made to managed binaries without impacting NGen images for dependent binaries (stage 272). When a particular binary has been updated, the system compares the original version with the updated version to see if any changes are of the kind in the safe changes list (stage 274). If the changes are determined to be safe (decision point 276), then the updated binary is optionally converted into a canonical form (stage 277). The term "canonical form" means that everything that the native image depends on in the old intermediate language (IL) image stays the same in the new IL image. For example, if a method was represented by token number N in the old IL image, and that token is used to represent that method in the NGen image, then that token must still be number N in the new IL image in order to be considered "canonical form".

The system adds additional information to the updated version to indicate compatibility with the original version (stage 278). In one implementation, the additional information is a resource (e.g. called TP info) that is added to the updated version of the binary to indicate that it is compatible with the original version. Numerous other types of additional information could be added to the binary to mark it as having "safe changes". If the changes are not determined to be safe (decision point 276), then the process ends at end point 280.

Figure 5:
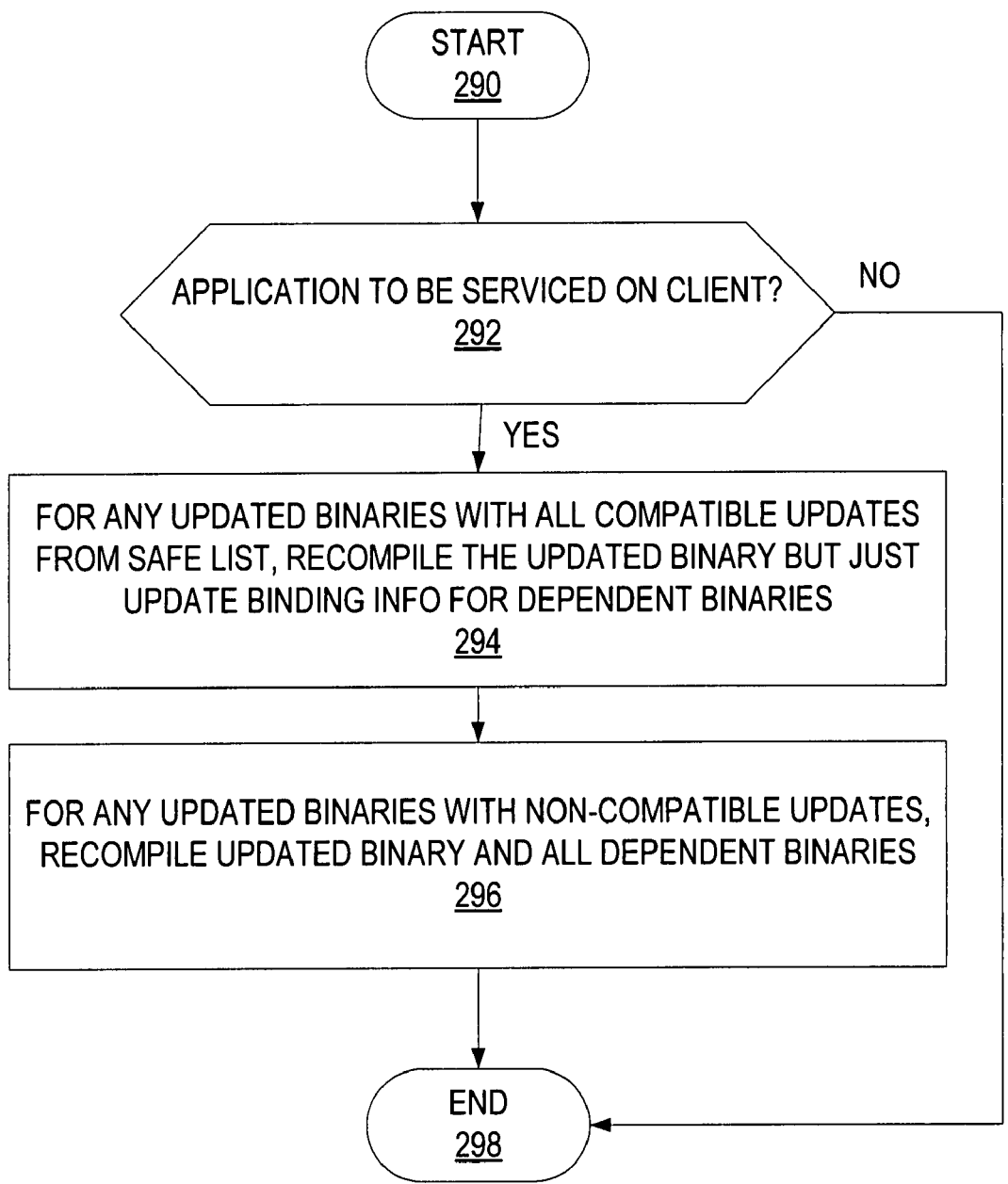
FIG. 5 is a process flow diagram for one implementation of the system of FIG. 1 illustrating the stages involved in providing a managed code servicing process.

FIG. 5 illustrates one implementation of the stages involved in providing a managed code servicing process. In one form, the process of FIG. 5 is at least partially implemented in the operating logic of computing device 100. The process begins at start point 290 with determining that an application is to be serviced on a client machine (decision point 292). For any updated binaries with all compatible updates from the safe list, the updated binary is recompiled on the client, but the dependent binaries just have their binding information updated to point to the updated binary (e.g. they are not recompiled) (stage 294). The stages for updating the dependent binary information to point to the updated binary are described in further detail in FIG. 6. For any updated binaries with non-compatible updates, the updated binary and all dependent binaries are recompiled (stage 296). The process ends at end point 298. The process of FIG. 5 will now be described in further detail in FIGS. 6 and 7.

Figure 6:
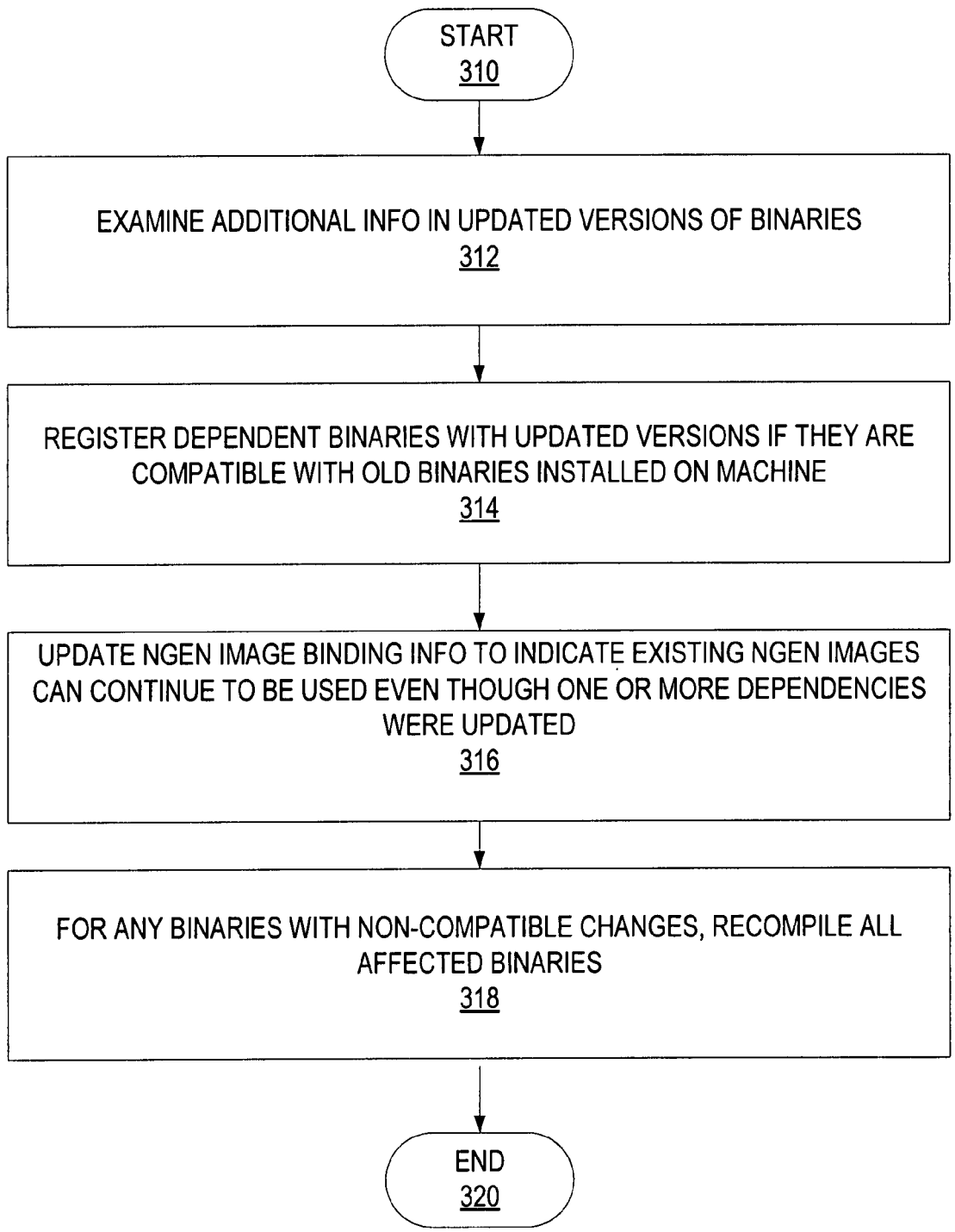
FIG. 6 is a process flow diagram for one implementation of the system of FIG. 1 illustrating the stages involved in providing a native generator process that examines additional info in updated binaries to register updates.

FIG. 6 illustrates one implementation of the stages involved in providing a native generator process that examines this additional information in updated binaries to register updates. In one form, the process of FIG. 6 is at least partially implemented in the operating logic of computing device 100. The process begins at start point 310 with examining the additional information contained in the updated versions of binaries that indicate safe changes are present (stage 312). The system registers dependent binaries with the updated versions of the changed binaries if they are compatible with old binaries installed on a machine (stage 314). The system updates the NGen image binding information to indicate the existing NGen images can continue to be used even though one or more dependencies were updated (stage 316). For any binaries with non-compatible changes, all affected binaries are recompiled (stage 318). The process ends at end point 320.

Turning now to FIG. 7, a logical diagram 350 is shown to illustrate exemplary components used in processes described in FIGS. 3-6. On a development machine, such as in a build lab, the source file 352 is compiled using a compiler 354 into an updated intermediate language binary/DLL (IL DLL) 356. The change analyzer 358 then compares the old version of the binary 360 with the updated version IL DLL 356 and determines that the changed IL DLL 356 contains safe changes. The change analyzer 358 updates the changed IL DLL 356 with TP info 362 to mark it has having safe changes. The updated binary with the TP info 362 is then placed on the client machine 364. An NGen update process involving recompilation 366 is performed on the updated binary 364 on the client machine. However, the binaries 370 that depend on the updated NGen image do not have to be recompiled because the updates were safe. The NGen update 372 just involves updating their NGen image binding information 374 in the registry to point to the updated binary instead of the previous binary 376.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for providing targeted patching for native generation images comprising the steps of:
    determining that changes made to at least one updated intermediate language binary are safe changes by comparing an older version of the updated intermediate language binary with the updated intermediate language binary to identify one or more changes and comparing the one or more changes to a safe list to determine that the changes are safe, wherein the safe list is a list of safe changes that can be made to managed intermediate language binaries without impacting the native generation images for dependent binaries;
    adding information to the updated intermediate language binary to indicate that the changes are safe if the changes are determined to be safe; and
    providing the updated intermediate language binary to a client machine, where any dependent binaries that depend on the updated intermediate language binary do not have to be recompiled as part of a native generation update process.

2. The method of claim 1, wherein the determining and adding stages are performed by an intermediate language change analyzer.

3. The method of claim 1, wherein prior to the providing stage, the updated intermediate language binary is converted to a canonical form.

4. The method of claim 1, wherein the added information can be accessed on the client machine to allow the client machine to determine that the updated intermediate language binary contains safe changes.

5. A computer-readable storage medium having computer-executable instructions for causing a computer to perform the steps recited in claim 1.

6. A computer-readable storage medium having computer-executable instructions for causing a computer to perform steps comprising:
    determining whether an application is to be serviced on a client machine;
    if the application is to be serviced on the client machine:
    identifying any compatible binaries with all compatible updates from a safe list, wherein the safe list is a list of safe changes that can be made to managed binaries without impacting native generation images for dependent binaries;
    adding information to the identified compatible binaries to indicate as safe;
    for the compatible binaries indicated as safe, perform a first type of native generation update that includes recompilation of the compatible binaries with the safe changes, and an updating of binding information for any dependent binaries of the compatible binaries;
    identifying as unsafe any non-compatible binaries that do not have all compatible updates from the safe list; and
    for the non-compatible binaries identified as unsafe, perform a second type of native generation update that includes recompilation of any non-compatible binaries and any dependent binaries of the non-compatible binaries.

7. The computer-readable storage medium of claim 6, wherein the first type of native generation update allows the compatible binaries to be serviced with little client compilation.

8. The computer-readable storage medium of claim 7, wherein the first type of native generation update allows later execution performance that is comparable to native code.

9. The computer-readable storage medium of claim 6, wherein the updating of binding information is performed by updating a registry.

10. The computer-readable storage medium of claim 6, wherein the compatible binaries are identified as being compatible by analyzing an indicator that designates that the changes in the compatible binaries were previously determined to be safe.

11. The computer-readable storage medium of claim 6, wherein the incompatible binaries are identified as being incompatible by analyzing an indicator that designates that the changes in the incompatible binaries were previously determined to be unsafe.

12. A method for providing a native generator process that examines additional information in updated binaries to determine how to process the update comprising the steps of:
    examining information contained in one or more updated binaries to determine if the updated binaries contain changes that are compatible with old binaries installed on a particular machine;
    for any respective updated binary of the one or more updated binaries that are determined to be compatible, registering any dependent binaries with the respective updated binary;

updating native generation image binding information to indicate existing native images can continue to be used even though dependent binaries were updated;

for any respective updated binary of the one or more updated binaries that are determined to be incompatible, recompiling all dependent binaries; and wherein the information is an indicator that specifies that the changes are safe if the indicator is set by comparing the changes to a safe list to determine that the changes are safe, wherein the safe list is a list of safe changes that can be made to managed binaries without impacting the native generation images for dependent binaries.

13. The method of claim 12, wherein the indictor was set by an intermediate language change analyzer on a separate machine than the particular machine.

14. A computer-readable storage medium having computer-executable instructions for causing a computer to perform the steps recited in claim 12.

* * * * *